United States Patent [19]

Kim

[11] Patent Number: 5,778,139
[45] Date of Patent: Jul. 7, 1998

[54] DIGITAL VIDEO DATA RECORDING WITH OUTER-ERROR-CORRECTION CODING OF TRICK-PLAY DATA AND APPARATUS FOR USE THEREWITH

[75] Inventor: Tae-eung Kim, Suwon, Rep. of Korea

[73] Assignee: Samsung Electronics Co., Ltd., Suwon, Rep. of Korea

[21] Appl. No.: 652,234

[22] Filed: May 23, 1996

[30] Foreign Application Priority Data

May 29, 1995 [KR] Rep. of Korea ............... 1995-13686

[51] Int. Cl.⁶ .................................................. H04N 5/783
[52] U.S. Cl. ................................................ 386/81; 386/116
[58] Field of Search ............................... 386/6–8, 33, 68, 386/81–82, 109, 111, 112, 124, 116, 40; 348/432; H04N 5/76, 5/92

[56] References Cited

U.S. PATENT DOCUMENTS

| | | | |
|---|---|---|---|
| 5,576,902 | 11/1996 | Lane et al. | 386/68 |
| 5,627,935 | 5/1997 | Kim | 386/81 |
| 5,631,998 | 5/1997 | Han | 386/68 |
| 5,646,931 | 7/1997 | Terasaki | 386/97 |

*Primary Examiner*—Thai Tran
*Attorney, Agent, or Firm*—Allen LeRoy Limberg

[57] ABSTRACT

A method and apparatus for recording/reproducing an ATV or DVB signal are provided. During recording, normal- and trick-play data are extracted from the signal transmitted with a transport packet structure. The extracted normal-play data are mapped into five sync blocks for every two transport packets and the normal-play data are then outer-error-correction-encoded after replacing the trick-play data having an SD-ECC structure with data of a predetermined pattern. The extracted trick-play data is then arranged in a video data region having the SD-ECC structure and the trick-play data are outer-error-correction-encoded by replacing the video auxiliary data having the SD-ECC structure with data of a predetermined pattern and mapping the result into a five-sync-block unit. The outer-error-correction-encoded normal- and trick-play data are rearranged in the video data region having the SD-ECC structure and then are inner-error-correction-encoded. During reproducing, the inner-error-correction-encoded normal- and trick-play data are inner-error-correction-decoded, the normal-play data are outer-error-correction-decoded by replacing the trick-play data with the pattern data used for encoding during a normal mode and the inner-error-correction-decoded trick-play data are outer-error-correction-decoded by replacing the video auxiliary data with the pattern data used for encoding trick mode data, after being arranged in the video data region. Thus, the trick-play data having the SD-ECC structure are mapped in the trick-play data region like normal-play data by using five sync blocks as a reference block so that one ECC circuit is used regardless of mode, to thereby decrease hardware requirements.

30 Claims, 9 Drawing Sheets

DIGITAL VIDEO DATA RECORDING WITH OUTER-ERROR-CORRECTION CODING OF TRICK-PLAY DATA AND APPARATUS FOR USE THEREWITH

The present invention relates to digital video data recording and reproducing of an advanced television (ATV) or digital video broadcasting (DVB) signal in a video cassette recorder (VCR) using an error correction code (ECC) structure similar to that of a standard definition (SD) signal.

BACKGROUND OF THE INVENTION

An SD-VCR apparatus for recording/reproducing an SD signal, including NTSC, PAL and high-definition (HD) signals, uses the SD signal format. ATV-VCR and DVB-VCR apparatuses for digitally recording/reproducing ATV and DVB signals using magnetic tape have been developed, each having an MPEG-2 structure and adopting the SD-VCR recording format. Methods for arranging trick-play data, improving screen quality or reducing noise problem may also be adopted. An ATV-VCR records programs in accordance with a single prescribed video signal format, but a DVB-VCR records programs in accordance with any one of a plurality of prescribed video signal formats. These video signal formats differ in the amount of line and pixel resolution in the images presented on the display screen; and these video signal formats differ with regard to whether field-to-field line (and pixel) interlace is used.

As shown in FIG. 1, when an ATV or DVB signal is supplied to an ATV-VCR or DVB-VCR apparatus via some kind of transmission path, the signals are placed into a transport packet. That is, the data on the transmission path has the layer structure of an MPEG-2 system with a packet structure consisting of 188 bytes. In FIG. 1, a 4-byte header is composed of at least one byte of sync data and three bytes of side information (SI) data. The header may include M further bytes, where M is a positive integer. A packet payload includes (184-M) bytes of audio/video data or user data. Video data in the packet payload is compressed.

The SD signal is intra-frame coded data having an ECC structure. The ECC code is a two-dimensional modified Reed-Solomon code (RS code). Per convention, the data bytes are considered as being arrayed in rows and columns. In the row direction, the error correction coding for digital video data in an SD signal is called an "inner code" and is of a type referred to as (85,8) code in which eight of the 85 bytes per row of digital video data are used for conveying row parity information; and in the column direction, the error correction coding is called an "outer code" and is of a type referred to as (149,11) code in which eleven of the 149 bytes per column of digital video data are used for conveying column parity information.

During recording, after outer error-correction encoding is performed by appending eleven bytes of outer parity to a 138-byte outer code in the column direction, the inner error-correction encoding is performed by appending eight bytes of inner parity to a 77-byte inner code in the row direction. During reproducing, or playback, the inner error-correction decoding is first performed in the row direction. In the inner error-correction decoding, after the error is corrected for a maximum of four bytes among 85 bytes in a sync block, any uncorrected sync block has an error flag appended thereto. Then, the outer error-correction decoding is performed in the column direction, for correcting uncorrected sync blocks up to a maximum of eleven bytes among 149 bytes, using the error flag for identifying those sync blocks that are subject to correction.

Also, in the case of an SD signal, each frame consists of only intra-frame-coded frames, each frame being divided into five segments, and five macro blocks are constructed by collecting one macro block located in a predetermined position of each segment of the SD signal frame. The number of bits per five macro blocks is fixed and is sequentially arranged in the scanning direction of the head to a video sector in units of the five macro blocks. As a result, the trick-play function can be achieved without an extra trick-play data region on the tape. Here, a transmission signal for recording constructs a DCT block arranged in eight rows and eight columns and forms the macro block by collecting a predetermined number (generally, four) of DCT blocks of luminance signals and a predetermined number (generally, two) of DCT blocks of chrominance signals. The codes variable-length-encoded in DCT block units are collected in sufficient number to keep the number of bits in each macroblock unit uniform.

FIG. 2 shows a signal format of a video sector supplied on the digital video tape having an SD-VCR recording format for recording. As shown in FIG. 2, the video sector on the digital video tape has the ECC structure. This SD-ECC structure is composed of the $19^{th}$ to $20^{th}$ sync blocks as a first video auxiliary data region, the $21^{th}$ to $155^{th}$ sync blocks as a video data region, the $156^{th}$ sync block as a second video auxiliary data region, and the $157^{th}$ to $167^{th}$ sync blocks as an outer parity region. Each sync block is composed of a 2-byte sync code, a 3-byte identification (ID) code, 77 bytes of data and an 8-byte inner parity suffix for the inner error-correction code.

On the other hand, the recording format of an ATV-VCR and a DVB-VCR has the ECC structure having the SD-VCR recording format as shown in FIG. 2. However, the $22^{th}$ to $155^{th}$ sync blocks of the video data region has a normal-play data region and a trick-play data region as shown in FIGS. 3 and 4.

In the ECC structure shown in FIG. 3, there are the normal-play data region of the $21^{st}$ to $126^{th}$ sync blocks and the trick-play data region of the $127^{th}$ to $155^{th}$ sync blocks in the region corresponding to the video data region of the $21^{st}$ to $156^{th}$ sync blocks. In the ECC structure shown in FIG. 3, using a method in which the format applied during videotape recording is one in which the data of a pair of tracks (video data, audio data, etc.) is repeatedly recorded on a number of tracks corresponding to twice the maximum multiple speed, the trick-play data region is arranged on a predetermined position of each track. With the FIG. 3 recording method, since the tape scanning is performed within the repeat-recording region without precise servo control, implementation of a trick play function does not significantly increase the cost of the recorder/reproducer. However, a great deal of the recording region is consumed, owing to the repeated recording. Also, the frame rate is excessively slow at the lower multiple speeds, resulting in flicker and jerkiness of motion which cause eye fatigue and impair picture quality.

The ECC block structure shown in FIG. 4 is applied to a tape having a recording format in which trick-play data are recorded on scanning regions corresponding to each of the multiple speeds. Also, k trick-play data regions are separately arranged on each track. The ECC block structure shown in FIG. 4, corresponding to the video data region shown in FIG. 2, is composed of a total of N(30) sync blocks within $1^{st}$ to $k^{th}$ trick-play data regions and a total of M(105) sync blocks within $1^{st}$ to $m^{th}$ normal-play data regions. With FIG. 4 method, the images reproduced during trick-play operation are excellent. However, since the corresponding regions of the arrangement for each trick-play speed have to be selectively scanned, the servo control has to be precise during trick-play operation, which increases costs.

According to FIGS. 3 and 4, the trick-play data region is composed of 30 sync blocks, but this structure may be varied. Recently, research concerning the recording method compensating problems of the recording methods shown in FIGS. 3 and 4 has been performed. The data in the trick-play data region, like SD signals, are intra-frame-coded.

On the other hand, the ATV and DVB signals in the normal-play region are inter-frame-coded signal having the MPEG-2 structure in which, during the inter-frame encoding of other frames other than the intra-frame within each group of pictures (GOP) unit (fifteen frames maximum), only the differences between the adjacent frames are encoded. Each GOP unit includes intra-frame data which can be independently coded without reference to data for another frame, predicted frame data which can be coded from the preceding intra-frame data or predicted frame data using motion compensation between adjacent frames, and bi-directional predicted frame data which can be coded from the preceding intra-frame data or predicted frame data and the following intra-frame data or predicted frame data using motion compensation.

The ATV signals descriptive of a GOP are described by normal-play data that occupies 150 helical recording tracks on the magnetic tape in a video cassette. The DVB signals descriptive of a GOP are described by normal-play data that occupies 180 helical recording tracks. Plural-track recording and playback heads are used to keep tape speeds lower, giving rise to indexing problems that are solved by using spectral shaping of the modulation for the tracks recorded parallel in time. Dual-track recording and playback heads are currently favored for a home VCR recording with 24-to-25 interleave-NRZ modulation. If servo tracking of the multi-track head were to be maintained or at least approximately maintained when the tape speed is increased during trick play to a prescribed multiple of the tape speed during normal play, the head wheel speed would have to be increased by the same prescribed multiple from the head wheel speed during normal play. Such increase in head wheel speed, while at the same time maintaining servo control, is difficult to achieve in practice. Furthermore providing for increasing head wheel speed to a multiple of head wheel speed during normal play introduces additional complication into the head wheel drive motor control. Accordingly, the trick-play data is preferably repeated severalfold on successive groups of tracks so the head wheel speed during trick play can be kept the same as during normal play.

Also, the data are supplied to the unit in the ATV-VCR and DVB-VCR for packing data into the payload portions of 188-byte transport packets. Here, a predetermined number of tracks compose one frame on the tape used in the ATV-VCR and DVB-VCR. Each track has the ECC structure having the recording format of SD-VCR as shown in FIGS. 3 or 4, and has 90-byte sync blocks, in which each sync block is composed of 90 bytes in the row direction. On this basis, each successive pair of 188-byte transport packets are mapped into five sync blocks of 77 bytes each as shown in FIG. 5, are inner- and outer-error-correction-encoded and then recorded on the video sector of the digital video tape. Here, the mapping from two transport packets into five sync blocks is denominated "two-to-five mapping". Usually, a 1-byte extra header is appended to each sync block and a 3-byte time stamp indicating a point of decoding time is further appended to each packet.

At this point, as shown in FIGS. 3 and 4, in the ATV-VCR and DVB-VCR having the recording format of SD-ECC structure separately having the normal-play data region and trick-play data region, the error correction encoding step for appending outer and inner parities to trick play data and the decoding step for decoding the error-correction-encoded trick-play data are required. Two methods are suggested for satisfying this requirement. One is error-correction-encoding and decoding the trick-play data having an SD-ECC structure which is the same as that of the normal-play data. The other is for error-correction-encoding and decoding the trick-play data having another ECC structure instead of an SD-ECC structure.

If the trick-play data has an ECC structure different from the SD-ECC structure, additional complicated hardware is required for error-correcting the trick-play data. Additionally, the hardware of an error-correction-decoding circuit is more complicated than that of the error-correction-encoding circuit. Also, if the error-correction encoding and -decoding circuits for the normal-play data, and another error-correction-encoding and -decoding circuits for the trick-play data are used, the hardware required therefor definitely increases.

The inventor points out that, since the transmission rates and program types in the DVB signal are subject to variation, ten further bits indicating the transmission rates and program types are utilized as extra header information in addition to the one byte of extra header information previously used for ATV recording. At the same time there is a strong desire not to reduce the payload in the digital recording signal.

SUMMARY OF THE INVENTION

According to the present invention, in a digital video tape recording/reproducing apparatus for ATV or DVB, an SD-ECC structure is employed both for error-correction-encoding and -decoding of the normal-play data and for error-correction-encoding and -decoding of the trick-play data. This permits using a single error-correction-circuit for both normal and trick modes, avoiding the need for an additional error-correction-circuit for the trick-play data.

In a further aspect of the present invention, in order to provide the compatibility between the ATV signal and the DVB signals having various transmission rates, when the two-to-five mapping is performed with respect to the normal-play data, a 20-bit extra header is appended to each transport packet, rather than prefacing each sync block with extra header information. The number of bits in each unit block of five sync blocks is not increased, nor is the number of bits in the payload decreased, in this departure from the previous practice in which an extra header of one byte (eight bits) prefaces each sync block.

Preferably, in accordance with a still further aspect of the invention, of the trick-play data are subjected to a mapping procedure that emulates the two-to-five mapping of the normal-play data, to avoid the need for special hardware to extract extra header information from the trick-play data.

More particularly, the following digital video data recording method embodies the recording aspects of the invention in preferred form. Normal- and trick-play data are extracted from the signal transmitted with a transport packet structure. The extracted normal-play data from each successive pair of transport packets is mapped into five successive sync blocks and is outer-error-correction-encoded exclusive of the trick-play data. The extracted trick-play data from each successive pair of transport packets is mapped into five successive sync blocks and is outer-error-correction-encoded exclusive of the video auxiliary data. An extra header longer than one byte by a predetermined number of bits is appended to each transport packet during the foregoing two-to-five mapping procedures. The outer-error-correction-encoded normal- and trick-play data are rearranged in a normal-play data region and a trick-play data region corresponding to the video data region having the SD-ECC structure and then inner-error-correction-encoded. The normal-play data reference block is mapped in the normal-play data region of the video sector of each track and the trick-play data reference block or trick-parity reference block is mapped in the trick-play data region of the video sector of each track.

More particularly, the following digital video data reproducing method embodies the reproduction or playback aspects of the invention in preferred form. During reproduction or playback, the inner-error-correction-encoded normal- and trick-play data are inner-error-correction-decoded, the normal-play data is outer-error-correction-decoded exclusive of the trick-play data during a normal mode and the inner-error-correction decoded trick-play data is outer-error-correction-decoded exclusive of the video auxiliary data during a trick mode, after being appropriately arranged within the video data region.

DETAILED DESCRIPTION OF THE INVENTION

Figure 3:
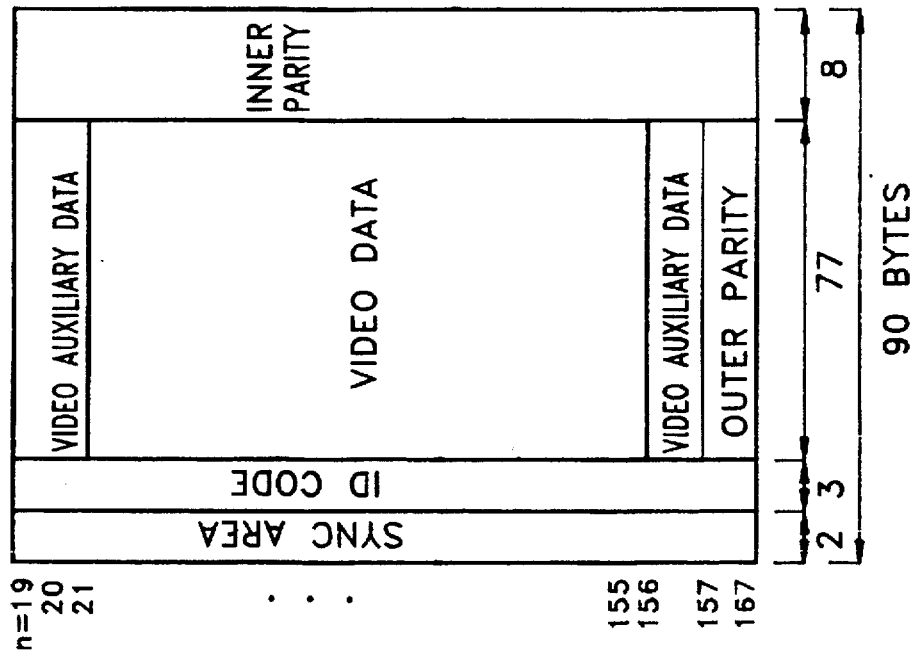
FIGS. 3 and 4 are diagrams for illustrating known arrangements of the trick-play data of a video sector supplied on digital video tape having an SD-VCR format for recording.
Figure 6:
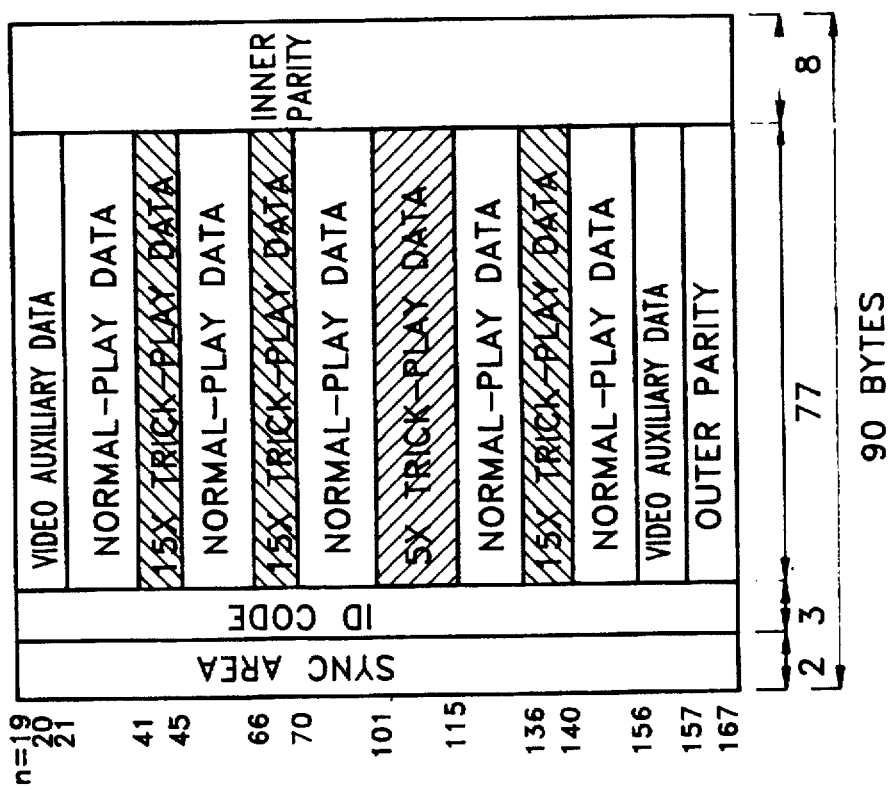
FIG. 6 a diagram for illustrating a signal format of a video sector supplied on digital video tape having an SD-VCR recording format for recording according to an aspect of the invention.
Figure 4:
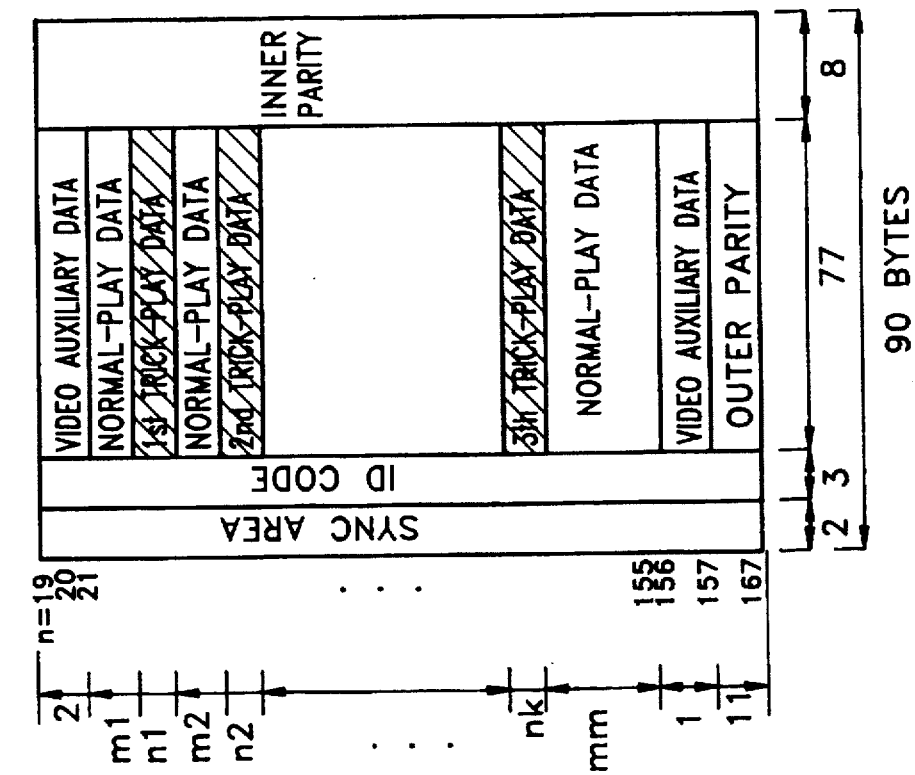

The ECC structure shown in FIG. 6 is a modified structure obtained by combining features of the ECC structures shown in FIGS. 3 and 4. In FIG. 6, in the video data region of the $21^{st}$ to $156^{th}$ sync blocks, the trick-play data of five-times speed are recorded on a total of fifteen sync blocks within the $101^{st}$ to $115^{th}$ sync blocks, and the trick-play data of fifteen-times speed are separately recorded on $41^{st}$ to $45^{th}$, $66^{th}$ to $70^{th}$ and $136^{th}$ to $140^{th}$ sync blocks, and the normal-play data are recorded on the remaining region.

The trick-play data are preferably recorded in bands with an integral number of unit blocks, each unit block consisting of five consecutive sync blocks. This facilitates emulating the format of the normal-play data resulting from its two-to-five mapping in the format of the trick-play data. The present invention can be applied to any ECC structure in which the normal- and trick-play data regions are composed of multiples of five sync blocks, however, including the ECC structure shown in FIG. 4 where the bands of trick-play data each contain only one, two or three 77-byte rows. Also, the present invention can be applied to both ATV-VCR and DVB-VCR.

The preferred arrangement of the trick-play data in FIG. 6 is the result of experiment and can be altered according to the multiple speeds used in the trick modes. The 15× trick-play speed offers fast search while avoiding too much flicker or loss of resolution in the trick-play image, but is a little bit hard to control when one desires to find a specific point in the recording. The slower 5× trick-play speed offers somewhat more control, but is high enough that flicker in the trick-play image is acceptably low. Recording the 15× trick-play image in three bands per SD-ECC structure and the 5× trick-play image in a single band per SD-ECC structure means that each trick-play SD-ECC structure must be repeated the same number of times (i.e., five pairs of tracks). This is because, advantageously, the respective numbers of bands in the higher-speed and lower-speed trick-play data are in the same ratio as tape velocities in the two modes. The tape distance over which each successive trick play image appears is the same in the higher-speed and lower-speed trick-play modes, so that trick play information tracks the normal play information it is recorded with. Accordingly, the same trick-play data can be used for each mode where the higher and lower speeds for trick play are in whole number ratio, n:1, with the trick-play data for the lower trickplay speed being recorded n-fold in one band per ECC field, and with the trick-play data for the higher trickplay speed being recorded n-fold in n bands per ECC field.

Figure 7:
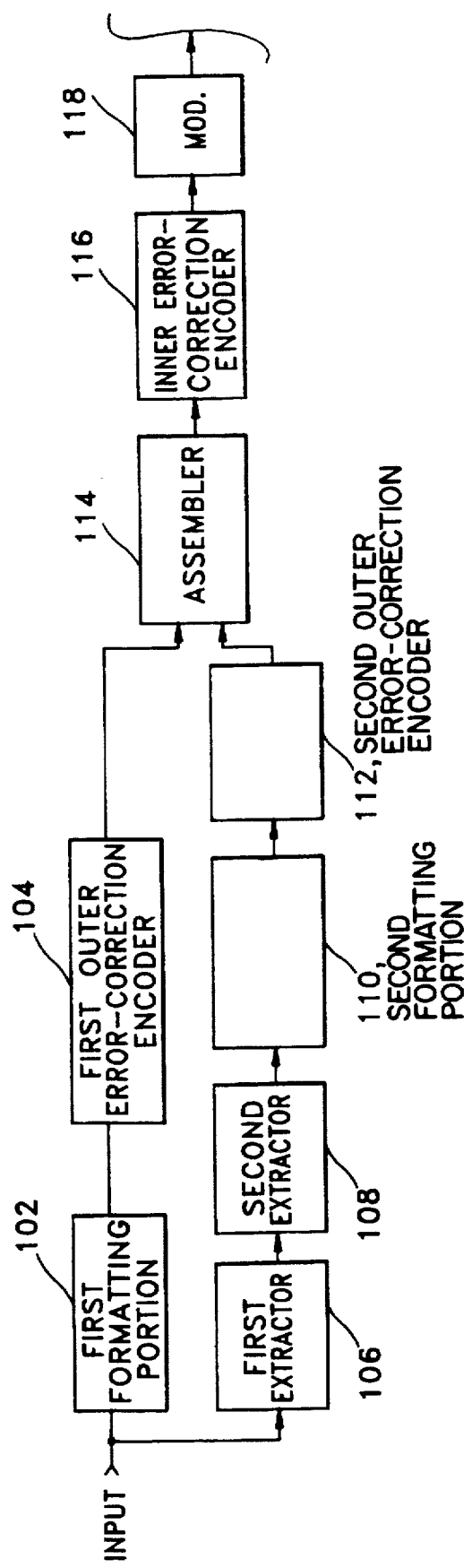
FIG. 7 is a block diagram of a digital video data recorder according to a preferred embodiment of an aspect of the invention.
Figure 8B:
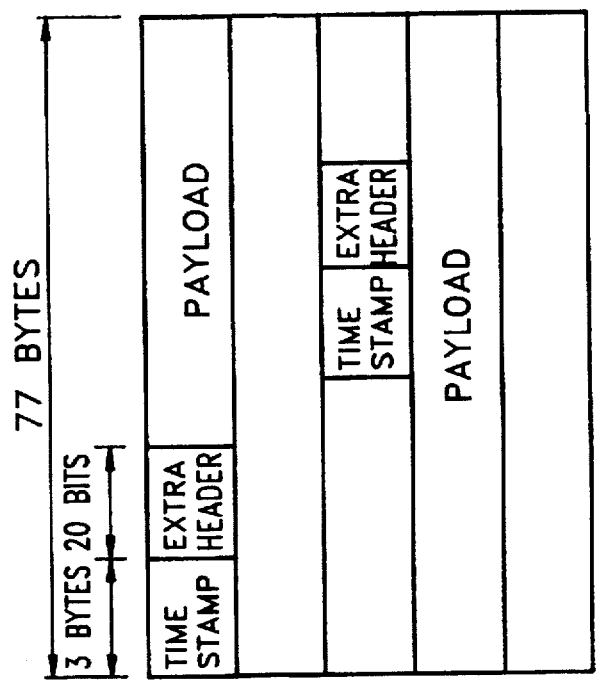
FIGS. 8A and 8B are diagrams for illustrating a two-to-five mapping performed by the first and second formatting portions shown in FIG. 7.
Figure 8A:
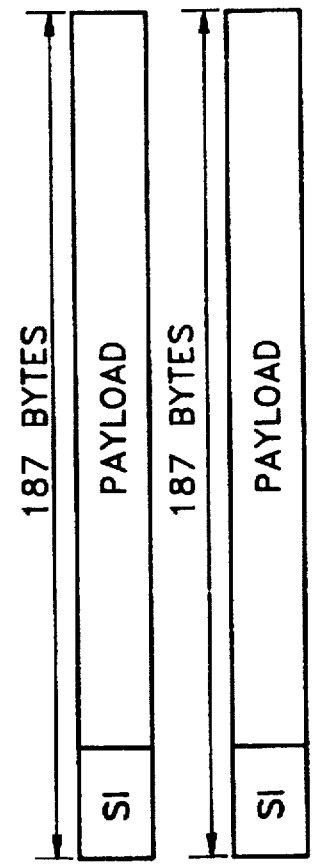

FIG. 7 is a block diagram of a digital video data recorder according to a preferred embodiment of the present invention. An ATV or DVB signal transmitted with the MPEG-2 transport packet structure is supplied to a first formatting portion 102, which performs two-to-five mapping of the signal, inserting time stamps therein, and thereby generates input signal for a first outer-error-correction encoder 104. More particularly, the first formatting portion 102 removes 1-byte sync data from the MPEG-2 video data of a 188-byte packet, combines two 187-byte packets as shown in FIG. 8A, and forms five sync blocks into a unit block as shown in FIG. 8B. The 1-byte sync is removed to obtain a more efficient data region and is superfluous inasfar as the recording process is concerned, since the assembler 114 appends sync and ID data to each sync block. The 1-byte sync can be restored during reproduction or playback, proceeding from the sync and ID data appended to each sync block by the assembler 114. As shown in FIG. 8B, five 77-byte sync blocks are formed from the two 187-byte transport packets, each preceded by respective header information. In each instance the header information consists of a 3-byte time stamp and a 20-bit extra header. This time stamp information, which is carried forward into the normal-play data, comprises a program clock reference (PCR), which is set to initial value at the beginning of each intraframe picture; a decoder time stamp (DTS), which is set to initial value at the beginning of each intraframe picture, and which increments at the beginning of each successive picture in the GOP to indicate when to begin decoding of the information descriptive thereof; and a picture time stamp (PTS) that directs the coder when to display each successive picture based on their original order.

The first outer-error-correction encoder 104 supplies first outer-error-correction encoded signal, generating outer parity for the normal-play data supplied from the first formatting portion 102 and the video auxiliary data provided from a servomechanism system controller (not shown). Each byte of trickplay data not used in the normal playback mode is replaced by a "null" byte of known value when calculating outer parity for the normal-play data and video auxiliary data. Since the bytes are each composed of eight bits, the data in the trick-play data regions could be set as binary values ranging from 0000 0000 (arithmetic zero) to 1111 1111 in 8-dimensional bit space. In actual practice it is preferable that each replacement byte be an arithmetic zero for simplifying the calculation of outer parity. Making each replacement byte be an arithmetic zero allows them to be omitted in the various parity-determining equations during the calculations of outer parity values, speeding up the calculations.

The ATV or DVB signal transmitted with the MPEG-2 transport packet structure descriptive of I intra-frame pictures, P predicted pictures and B bi-directionally interpolated pictures is also supplied to a first extractor 106, which extracts the intra-frame data from the transmitted MPEG-2 video data for application to a second extractor 108. This extraction is done with reference to the packet ID of a packet header and more particularly to a three-bit code extracted from the packet header of a video packet, which three-bit code identifies whether its payload is descriptive of an I, P or B picture. For each trick-play speed the second extractor 108 then extracts a DC coefficient and AC coefficients having only low frequency components from each DCT block of the extracted intra-frame data, to supply a predetermined number of bits per frame for use as trick-play data. The number of AC coefficients per block retained for a faster trick-play speed (e.g., 15× normal speed) is smaller than the number of AC coefficients per block retained for a slower trick-play speed (e.g., 5× normal speed). The trick-play data are supplied to a second formatting portion 110, which maps the trick-play data to emulate the the two-to-five mapping of the normal-play data, inserting time stamps in the reformatted trick-play data, which time stamps differ from those inserted into the first outer-error-correction encoded signal.

The time stamp information for the trick-play data comprises a program clock reference (PCR), which is set to initial value at the beginning of each intraframe picture, and a picture time stamp (PTS) that directs the coder when to display each successive intraframe picture based on their original order. Since there are no interframe pictures to be decoded, the time stamp information for the trick-play data does not include a decoder time stamp (DTS).

Figure 10:
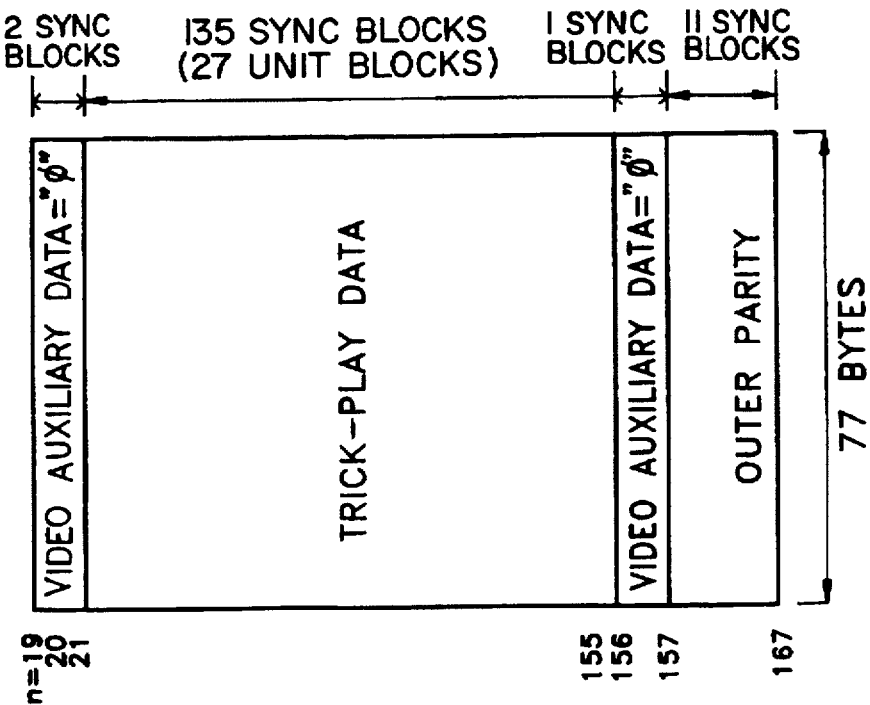
FIG. 10 is a diagram for illustrating the outer error-correction encoding performed by the second outer error-correction encoder shown in FIG. 7.
Figure 9:
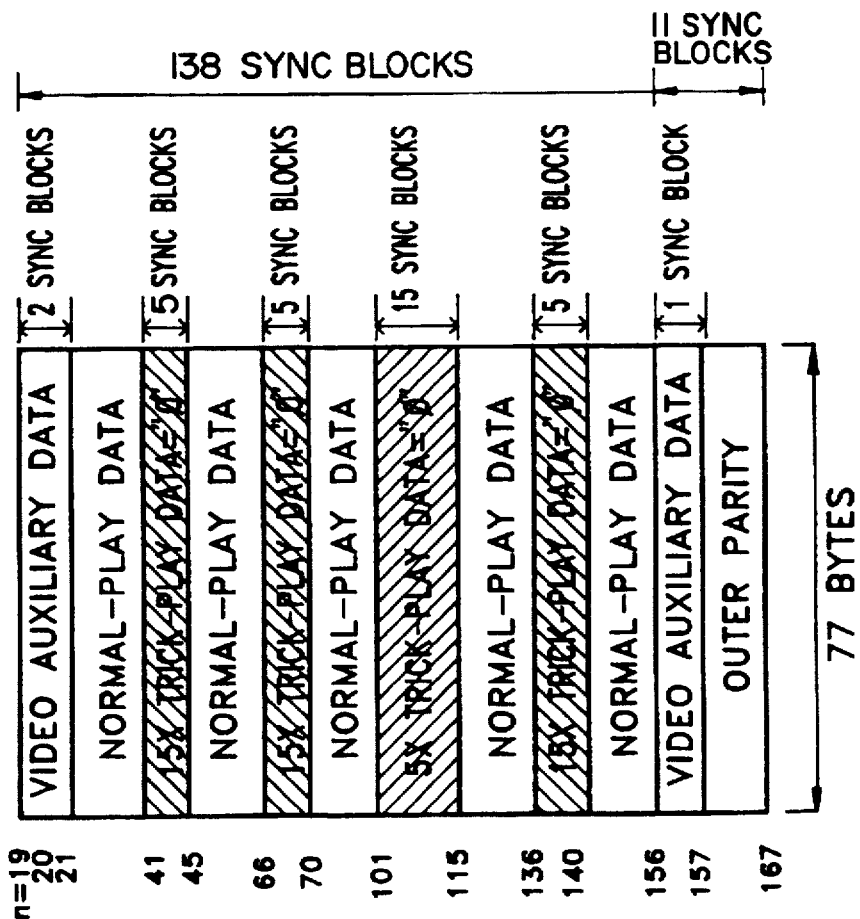
FIG. 9 is a diagram for illustrating the outer error-correction encoding performed by the first outer error-correction encoder shown in FIG. 7.

The reformatted trick-play data are supplied from the second formatting portion 110 and applied as input signal to a second outer-error-correction encoder 112, which provides separate outer-error-correction coding for the slower speed trick-play data and for the faster speed trick-play data. In accordance with an aspect of the invention, the outer-error-correction encoding of trick-play data at each trick-play speed is carried out independently from outer-error-correction encoding at any other trick-play speed, and is carried out independently of the outer-error-correction encoding of normal-play and auxiliary video data. The outer-error-correction encoding algorithms for trick-play data are modifications of the standard ones for SD-ECC that are only slightly expurgated, rather than being substantially expurgated as when outer-error-correction encoding normal-play and video-auxiliary data. The expurgation is done to limit the number of sync blocks to a multiple of five, to accord with the emulation of two-to-five mapping in the trick-play data structure. The $21^{th}$ to $156^{th}$ sync blocks of the SD-ECC structure are used with the $19^{th}$, $20^{th}$, and $157^{th}$ sync blocks in effect replaced by arithmetic zero bytes as shown in FIG. 10. Outer-error-correction encoded trick-play data are supplied from the encoder 112 for application to the assembler 114.

Figure 11:
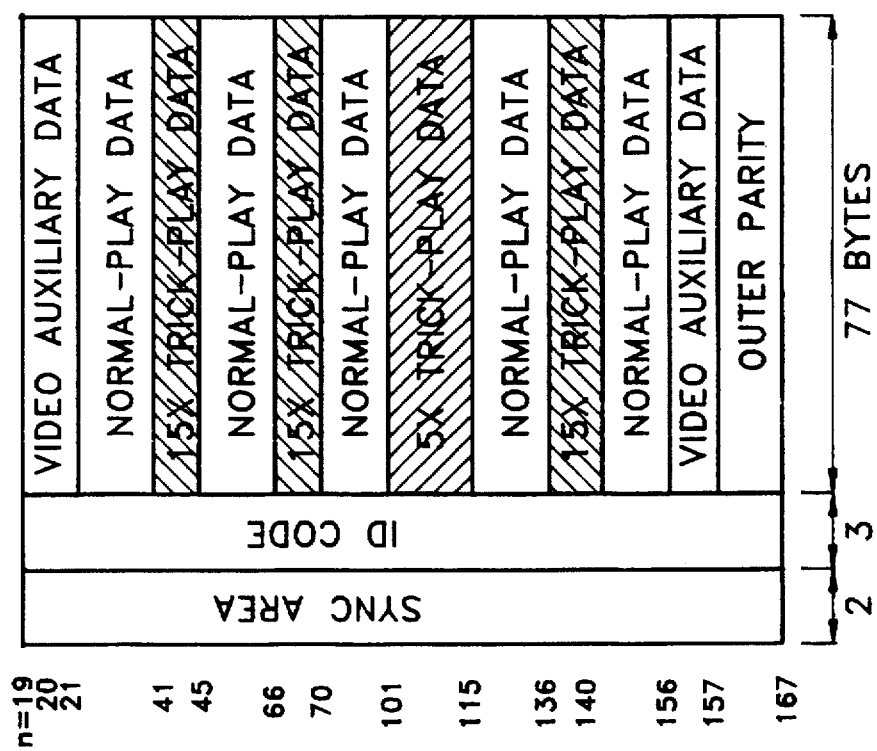
FIG. 11 is a diagram showing the result of assembling performed by the assembler shown in FIG. 7.

The assembler 114 of FIG. 7 arranges the outer-error-correction-encoded normal-play data and video auxiliary data that the first outer error-correction encoder 104 supplies for a data frame in the normal-play data region of the basic SD-ECC structure shown in FIG. 11. The assembler 114 arranges the trick-play data reference block or trick-parity reference block that the second outer-error-correction encoder 112 supplies for the data frame in the trick-play data region of the basic SD-ECC structure shown in FIG. 11. The assembler 114 prefixes each 77-byte row in the basic SD-ECC structure shown in FIG. 11 with 2-byte sync information and with a 3-byte ID code. (Alternatively, the 2-byte sync information and 3-byte ID code may be appended before outer error-correction-encoding or after inner error-correction-encoding.) The assembled data are supplied row-by-row from the assembler 114 to an inner-error-correction encoder 116 for inner-error-correction encoding.

The inner error-correction encoder 116 receives the data assembled in the basic SD-ECC structure shown in FIG. 11 and appends 8-byte inner parity suffix to each of the 149 sync blocks resulting in the final SD-ECC structure shown in FIG. 6. The inner error-correction encoder 116 supplies inner-error-correction encoded data, which is preferably subjected to burst-error-suppression interleaving, before being applied to a modulator 118 of known type that generates modulation for recording on the electromagnetic video tape. During reproduction from the electromagnetic video tape the burst-error-suppression interleaving is undone in a complementary de-interleaving procedure that converts burst errors to randomly occurring isolated errors which are more readily corrected by the error-correcting codes.

The modulator 118 preferably is of a type that performs 24-to-25 modulation. During 24-to-25 modulation, inner-error-correction encoded digital data from the inner error-correction encoder 116, which preferably is burst-error-suppression interleaved, are parsed into 24-bit digital words that are converted into the two-channel 25-bit digital data by affixing a "0" or a "1" prefix to each 24-bit digital word. The two-channel 25-bit digital data are then interleave-NRZI-modulated. Thereafter, one of two-channel 25-bit data prefixed with a "0" or a "1", which has an intended frequency spectrum, is selected and the selected one is recorded on the video sector of the digital video tape.

There are a variety of ways to organize buffer storage for data in the FIG. 7 digital video data recorder. It is desirable to avoid utilizing data-frame storage buffers, each of which can store an entire SD-ECC structure as a data frame. By operating the digital video data recorder so as to transfer the signal essentially just in row-by-row terms, rather than so as to transfer the signal at times in column-by-column terms, the need to utilize data-frame storage buffers can be avoided, and the assembler 114 can be reduced to a simple time-division-multiplexer. Buffer storage is included in the source of the ATV or DVB signal to the FIG. 7 digital video data recorder, and the reading from that buffer storage to the first formatting portion 102 can be controlled to implement pipeline transfer of the signal in row-by-row terms through the first formatting portion 102, the first outer-error-correction encoder 104, and the assembler 114 to the inner-error-correction encoder 116.

In such pipeline operation the first outer-error-correction encoder 104 avoids need for any data-frame storage buffers therein by using accumulation methods to generate the outer parity bytes for first outer-error-correction coding. Eleven random access memories RAMs each providing buffer storage for one sync block (less inner parity) are operated for selectively accumulating the rows of normal-play data supplied from the first formatting portion 102 and video auxiliary data provided from the servomechanism system controller. A respective one of the eleven sync blocks of outer parity bytes for normal-play and video auxiliary data is accordingly accumulated by each of the RAMs, and is read out to the assembler 114 at at an appropriate time.

The buffer storage included in the source of the ATV or DVB signal to the FIG. 7 digital video data recorder usually can be organized in such a way that throughout a whole GOP information concerning the most recent intraframe picture is available for reading, so that the first extractor 106 need not include its own buffer storage, but can essentially be circuitry for generating read addressing and read enable signaling for the earlier buffer storage. The second extractor 108 includes first-in/first-out buffer memory arranged to supply bytes of data at uniform rate to the second formatting portion 110 in segments comprising a desired number of 77-byte rows. The control circuitry for doing this supplies information back to the first extractor 106 to control its accessing of the buffer storage included in the source of the ATV or DVB signal, so as to receive additional information concerning the most recent intraframe picture as demanded so the second extractor 108 can fulfill its output obligations. There is intermittent pipeline flow from the second extractor 108 through the second formatting portion 110, the second outer-error-correction encoder 112, and the assembler 114 to the inner-error-correction encoder 116. The intermittent pipeline flow for 5× trick play data occurs in fifteen row segments and the intermittent pipeline flow for 15× trick play data occurs in five row segments.

The second formatting portion 110 includes a buffer capable of storing at least five sync blocks, used for re-formatting the trick-play data and inserting time stamps therein in a mapping procedure that emulates the two-to-five mapping procedure for normal-play and video auxiliary data. This buffer can be a RAM intermittently written five sync blocks at a time with time stamp information and with trick play data for the particular trick-play speed supplied from the second extractor 108, then read, and then written over. This mode of operation is possible, since outer-error-correction encoded and time stamped trick-play data for each speed can be supplied to the assembler 114 on an intermittent basis, and since the trick-play data for each speed is available to be supplied to the second formatting portion 110 on an intermittent basis. Alternatively, the RAMs in the second formatting portion 110 can be of dual-port design, with their serial output ports connected for supplying trick-play data to the second outer-error-correction encoder 112 and to the assembler 114 beyond.

For each speed of trick play, the second outer-error-correction encoder 112 is provided a respective set of eleven random access memories RAMs each providing buffer storage for one sync block (less inner parity), which are operated for selectively accumulating the rows of trick-play data supplied from the second formatting portion 110 for that speed of trick play. A respective one of the eleven sync blocks of outer parity bytes for that speed of trick play is accordingly accumulated by each of the RAMs in that set of eleven, and is read out to the assembler 114 at an appropriate time.

In other embodiments of the invention, which are less preferred, the first outer-error-correction encoder 104 includes full-data-frame storage buffering, used to support the calculation of outer parity for normal-play and video auxiliary data; and the second outer-error-correction encoder 112 includes full-data-frame storage buffering for each trick-play speed, used to support the calculation of outer parity for that trickplay speed. It is far more economical of memory to perform the outer parity calculations on a running basis through the data frames, storing the interim partial results of just those running calculations, than to store the data frames and perform the outer parity calculations at the conclusions of data frames.

Figure 1:
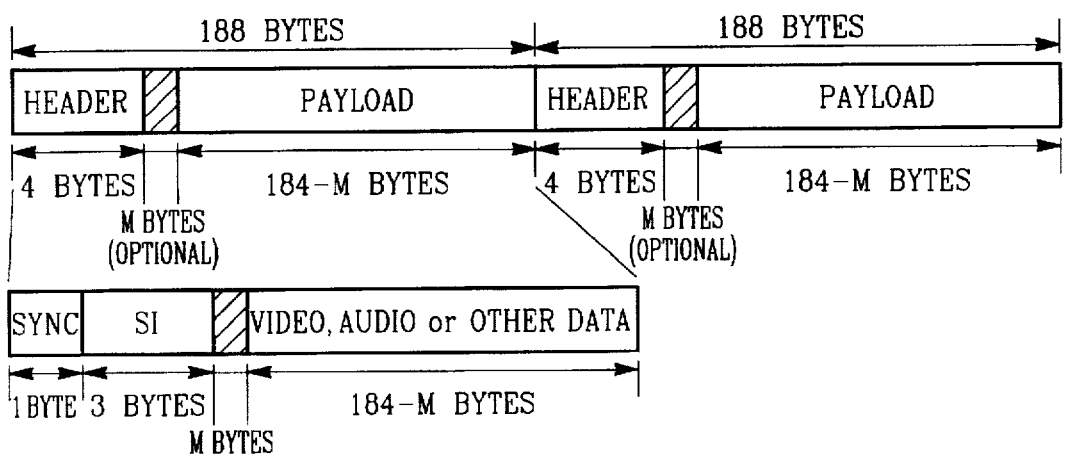
FIG. 1 is a diagram for illustrating the known MPEG-2 transport packet structure.
Figure 5:
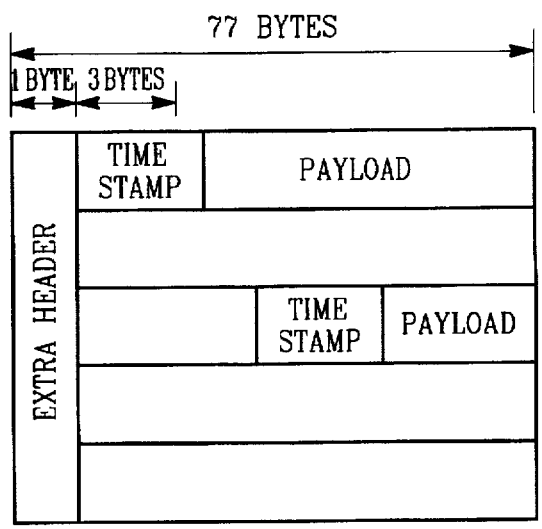
FIG. 5 a diagram for illustrating the known procedure of two-to-five mapping, in which two transport packets are mapped into five sync blocks.
Figure 2:
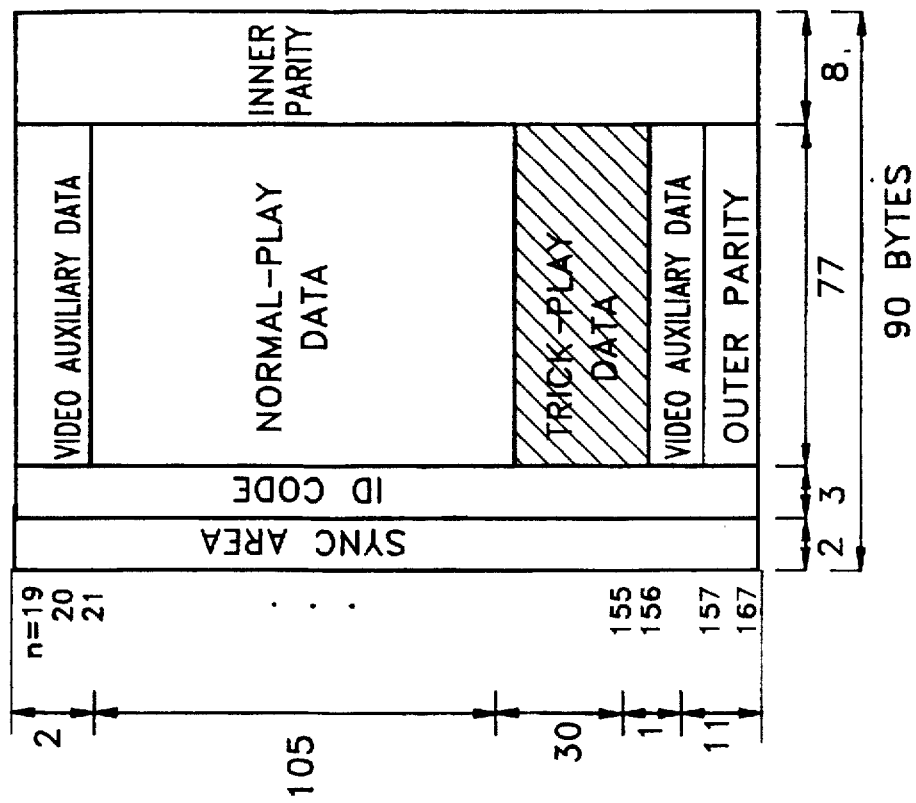
FIG. 2 is a diagram for illustrating a known signal format of a video sector supplied on the digital video tape having an SD-VCR recording format for recording.

As disclosed above, since the DVB-VCR, in which the transmission can be performed with various transmission bit rates according to picture quality, requires extra bits for selecting the transmission bit rate and program, a 1-byte extra header for each sync block as shown in FIG. 5 has an insufficient number of bits. The number of bytes in the unit block consisting of five consecutive sync blocks cannot be increased and stay within the SD-ECC format, and it is undesirable to reduce the number of bytes in the payload. Therefore, during the two-to-five mapping process the first formatting portion 102 of a digital video data recorder constructed in accordance with an aspect of the invention adds a 20-bit extra header to each packet, next to its time stamp as shown in FIGS. 8A and 8B, rather than appending an 8-bit extra header to each sync block. The number of extra header bits in each unit block of five sync blocks is unchanged, but the redundancy in the forty bits of extra header information is reduced, so more information can be conveyed by those bits.

In the 20-bit extra header, there are two bits for representing data type, six bits for representing trick mode, two bits for representing program ID and two bits for representing transmission bit rate. The remaining eight bits are reserved. The two bits for representing data type represents whether the data is a normal-play data, trick-play data (five-times speed data, fifteen-times speed data, etc) or dummy data. The six bits for the trick mode consist of a 1-bit toggle flag representing whether the corresponding packet that follows is the earlier or later of the two packets in the reference block and 5-bit flag representing the identification number or ID of the trick-play data reference block or trick-parity reference block. The two bits for transmission bit rate indicate one of 25 Mbps, 12.5 Mbps and 6.25 Mbps. If the transmission bit rate of 25 Mbps is selected, only one program having high-resolution picture quality is recorded on the tape. However, if the transmission bit rate of 12.5 Mbps is selected, two programs whose picture quality is inferior to that of 25 Mbps transmission bit rate can be simultaneously recorded; and is selected, four programs whose picture quality is inferior to that of 25 Mbps transmission bit rate can be recorded 6.25 Mbps is selected, four programs whose picture quality is inferior to that of 25 Mbps transmission bit rate can be simultaneously recorded. Thus, two bits for representing program ID indicate a corresponding program among a plurality of programs (four maximum) determined according to the transmission bit rate.

A 20-bit extra header is also appended to each packet during a two-to-five mapping process in the second formatting portion 110. In order to map the trick parity and trick-play data into five sync blocks, the second formatting portion 110 formats the trick-play data of 135 sync blocks (three sync blocks of the first and second video auxiliary data regions are excluded), which are provided from the second extractor 108 into 27 trick-play data reference blocks each of which includes five sync blocks, and formats 11-sync block trick outer parity into three trick-parity reference blocks, and then performs the formatting by receiving the time stamp and extra header as shown in FIG. 8B. Here, in one of three trick-parity reference blocks, there is the trick-outer parity of only one sync block, and the remaining four sync blocks are reserved while being filled with dummy data of arithmetic zeroes. In the remaining two trick-parity reference blocks, there is the trick-outer parity of ten sync blocks.

Also, each reference block ID of 27 trick-play data reference blocks is set in a range from 00000 (zero) to 11010 and each reference block ID of three trick-parity reference blocks is set in a range from 11011 to 11101.

Figure 12:
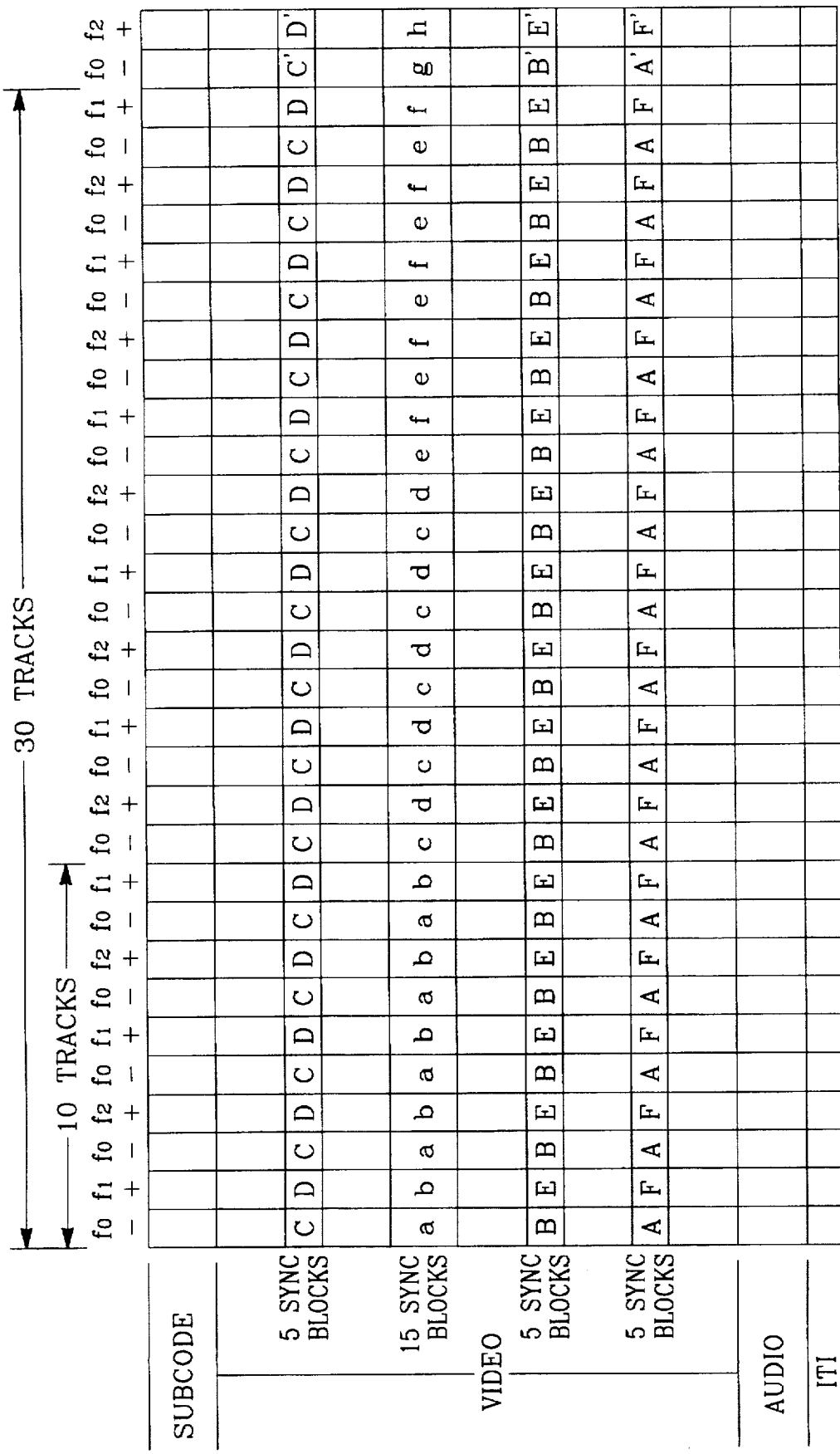
FIG. 12 is a diagram for illustrating the track structure of the digital video tape having SD-VCR recording format according to an aspect of the invention.

FIG. 12 is a diagram for illustrating the track structure of the digital video tape having SD-VCR recording format according to the present invention.

In FIG. 12, the horizontal direction represents the tape traveling direction and the vertical direction represents the head traveling direction. The serial numbers of sync blocks are assigned along the head traveling direction. That is, the number "1" is assigned to the sync block from which the head traveling is started and the sync block numbers serially increase along the head traveling direction. Each track is classified in a sequence of head scanning; that is, an inserted and track information (ITI) sector on which track information is recorded, an audio sector, a video sector and a subcode sector.

Also, the track having a negative azimuth angle has an $f_0$ frequency characteristic and the track having a positive azimuth angle has alternating $f_1$ and $f_2$ frequency characteristics. Here, $f_0$, $f_1$ and $f_2$ are frequencies set for frequency tracking.

According to the recording method using the format shown in FIG. 12, the trick-play data are separately recorded on a first track pair consisting of a predetermined first track and a second track which is adjacent to the first track toward the tape proceeding direction. The trick-play data recorded on the first track pair are repeatedly recorded on the tracks adjacent to the first track pair toward the tape proceeding direction as the same pattern. Here, the number of track pairs on which the trick-play data are repeatedly recorded corresponds to the multiple of trick-play speed. Thus, since the number of track pairs on which the trick-play data are repeatedly recorded should be an integer, the multiple speed number is limited to being an integer. Also, since the trick-play data are separately recorded on successive track pairs, the speed multiple should be an odd integer for adjusting head phase during the trick reproducing process.

As an example, the five-times speed trick-play data region located at the center of each track is experimentally arranged in a region which is commonly scanned by the opposing heads and the pair of heads which are adjacent to each other when the head travels at the multiple speed corresponding to five-times speed trick-play data. Thus, a pair of tracks on which five-times speed trick-play data (or trick-parity) different for each track, are recorded is repeated five times so that the trick-play data is recorded on a total of ten tracks. Also, a pair of tracks on which fifteen-times speed trick-play data, different for each track, are recorded is repeated fifteen times so that the trick-play data are separately recorded on a total of thirty tracks.

In the recording format shown in FIG. 12, obtained by combining the formats shown in FIGS. 3 and 4, a plurality of trick-play data regions corresponding to the scanning positions according to the multiple speeds are in each track, and a track pair consisting of two adjacent tracks on which the trick-play data (different from each other) are recorded is repeated as track number corresponding to each multiple speed. As a result, a precise servo control is not necessary, so that the additional hardware requirement is decreased.

The recording format shown in FIG. 12 as a preferred embodiment may be variously modified.

Figure 13:
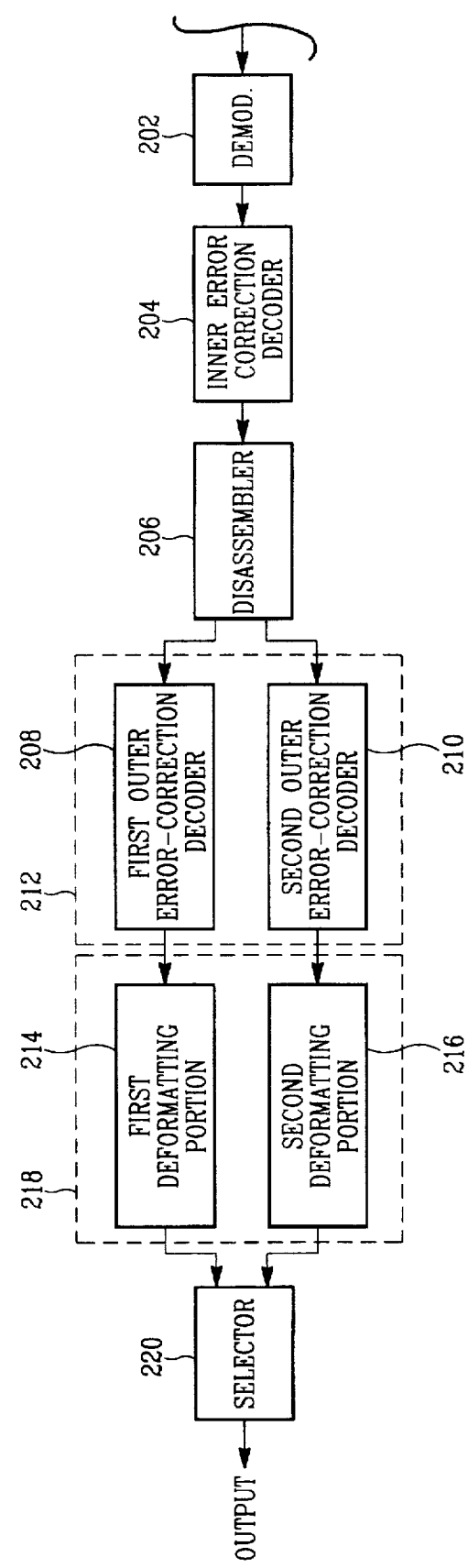
FIG. 13 is a block diagram of a digital video data reproducer according to a preferred embodiment of an aspect of the invention.

FIG. 13 is a block diagram of a digital video data reproducer according to a preferred embodiment of the present invention. In FIG. 13, a demodulator 202 demodulates 24-to-25- modulated data. Also, an inverse ECC block arranger for arranging the modulated data as the ECC structure after deinterleaving thereof (assuming the modulated data are burst-error-suppression interleaved data) may be constructed.

An inner error-correction decoder 204 inner-error-correction-decoder decodes the modulated normal- and trick-play data. A maximum of four bytes per sync block of 85 bytes are error-corrected in a row unit, and an error flag is appended to each uncorrected sync block. In the case of two-dimensional RS code, the bytes corresponding to half the inner parity can be inner-error-corrected, and the bytes corresponding to the byte number of outer parity can be outer-error-corrected, owing to the error flag signal indicating error position.

A disassembler 206 separates 2-byte sync-code and 3-byte ID code from the inner-error-correction-decoded normal- and trick-play data. The 3-byte ID code is used to control the write addressing of data-frame-storage buffering in the outer error-correction-decoder circuitry 212. For example, the together with bits indicating the playback mode and portions of the 3-byte ID code can be used as addressing for a read-only memory (ROM) that generates the write addressing and write enable signals for the data-frame-storage buffering.

During the normal mode a first outer error-correction decoder 208 writes the normal-play and video auxiliary data supplied from the disassembler 206 into the data-frame-storage buffering used to support the decoding of the outer error-correction coding of the normal-play and video auxiliary data. The normal-play and video auxiliary data are stored in a video data region of the buffering organized in accordance with the SD-ECC structure. The data of the trick-play data regions in this SD-ECC structure are filled with all arithmetic zeroes or with predetermined pattern data as used during the outer error-correction encoding of the normal-play and video auxiliary data. Then, the second outer error-correction decoder 210 outer-error-correction-decodes the normal-play and video auxiliary data, when the digital video data reproducer is operated in the normal-play mode.

A first deformatting portion 214 receives the normal-play data supplied from the first outer error-correction decoder 208 in five 77-byte sync block units and separates the time stamp and the extra header, to thereby construct two 187-byte transport packets. Also, 1-byte packet sync data is appended to each packet so that a 188-byte transport packet is transmitted to a selector 220.

During the trick mode a second outer error-correction decoder 210 writes the trick-play data supplied at intermittent times from the disassembler 206 into data-frame-storage buffering used to support the decoding of the outer error-correction coding of the trick-play data. The trick-play data are stored in a video data region of data-frame buffering organized in accordance with the SD-ECC structure. The data of the first and second video auxiliary data regions in this SD-ECC structure are filled with all arithmetic zeroes or with predetermined pattern data as used during the outer error-correction encoding of the trick-play data. Then, the second outer error-correction decoder 210 outer-error-correction-decodes the trick-play data, when the digital video data reproducer is operated in the trick-play mode.

Portions of the structure of each of the first and second outer error-correction decoders 208 and 210, together constituting the outer error-correction-decoder circuitry 212, are the same as each other. Accordingly, the outer error-correction-decoder circuitry 212 are preferably modified to replace the first and second outer error-correction decoders 208 and 210 with a single, shared outer error-correction decoder, the data-frame buffering therein being written differently in the normal and trick modes of play. For the convenience of description, however, the first and second outer error-correction decoders 208 and 210 are separately designated. Here, since the structure of the first and second outer error-correction decoders 208 and 210 requires data frame storage and is more complicated than that of the first and second outer error-correction encoders 104 and 110, if the first and second outer error-correction decoders 208 and 210 are not shared, the hardware requirement is significantly increased.

A second deformatting portion 216 constructs two 187-byte transport packets from the outer-error-correction-decoded trick-play data of a reference block unit supplied from the second outer error-correction decoder 210, and appends 1-byte packet sync data to each packet. As a result, a 188-byte packet is transmitted to the selector 220. Since the first and second deformatting portions 214 and 216 are the same, or substantially so, the deformatting circuitry 218 preferably replaces the first and second deformatting portions 214 and 216 with a single shared, deformatting portion.

The selector 220 selects the outer-error-correction-decoded normal- or trick-play data transmitted from the first deformatting portion 214 or the second deformatting portion 216 according to the normal or trick mode, and transmits the selected data. Where the first and second deformatting portions 214 and 216 are replaced with a single shared, deformatting portion, the selector 220 is not used, of course. If separate first and second outer error-correction decoders 208 and 210, a selector is used to select one of the responses of the decoders 208 and 210 as input signal for the single shared, deformatting portion. If a single, shared outer error-correction decoder is used instead of separate first and second outer error-correction decoders 208 and 210, the selector 220 is replaced with circuitry for suitably controlling, in accordance with the reproduction mode, the write enabling of the data-frame buffering of the outer error-correction-decoder circuitry 212, the insertion of arithmetic zeroes or fixed pattern data into the data-frame buffering in rows before and after those containing trick-play data, and the reading of the data-frame buffering to support outer-error-correction decoding of the trick-play data stored in the data-frame buffering.

What is claimed is:

1. A method for recording digital video data on a tape, which digital video data include independently decodable frame data and dependently decodable frame data, bytes of which said independently decodable frame data are supplied during predetermined intervals and bytes of which said dependently decodable frame data are supplied during intervening intervals between said predetermined intervals, said method comprising the steps of:

receiving said bytes of said independently decodable frame data supplied at said predetermined intervals and said bytes of said dependently decodable frame data supplied during said intervening intervals, for use as normal-play data;

extracting trick-play data for each of a prescribed number of trick-play speeds, the extracting being made from said bytes of said independently decodable frame data supplied at said predetermined intervals;

calculating bytes of trick-play outer parity for outer-error-correction coding of said trick-play data for each said trick-play speed, as formatted into a succession of trick-play reference blocks for that said trick-play speed, said bytes of outer parity for outer-error-correction coding of said trick-play data being calculated independently of data outside said trick-play data region of said trick-play reference block for that said trick-play speed, each said trick-play reference block consisting of a first predetermined number of data rows, each said trick-play reference block having a respective trick-play data region consisting of a plurality of data rows, a respective region of trick-play outer parity consisting of a plurality of data rows, and a respective remainder region including other data rows of fixed pattern information;

calculating bytes of normal-play outer parity for outer-error-correction coding of said normal-play data as formatted into a succession of normal-play reference blocks, said bytes of outer parity for outer-error-correction coding of said normal-play data being calculated independently of data outside said normal-play data region and said video auxiliary data region, each said normal-play reference block consisting of a second predetermined number of data rows, each said normal-play reference block having a respective normal-play data region consisting of a plurality of data rows, a respective video auxiliary data region consisting of a plurality of data rows, a respective trick-play data region for each said trick-play speed consisting of a plurality of data rows of null information, and a respective outer parity region consisting of a plurality of data rows;

inserting successive rows of each successive one of said trick-play reference blocks into the respective trick-play data region for that trick-play speed in successive ones of said normal-play reference blocks, each of which said trick-play data regions has fewer data rows than are contained in said trick-play reference block for that said trick-play speed, thereby generating interleaved outer-error-correction encoded normal-play data and outer-error-correction encoded trick-play data;

calculating bytes of inner parity for inner-error-correction coding of each row of said interleaved outer-error-correction encoded normal-play data and outer-error-correction encoded trick-play data;

generating from each said row of said interleaved outer-error-correction encoded normal-play data and outererror-correction encoded trick-play data, a respective sync block of digital signal for recording, said step of generating including a substep of appending to each said row of said interleaved outer-error-correction encoded normal-play data and outer-error-correction encoded trick-play data said bytes of inner parity for inner-error-correction coding thereof; and recording each said sync block of digital signal at a predetermined position of a track on said tape.

2. A method as set forth in claim 1, wherein said steps of recording each said sync block of digital signal at a predetermined position of a track on said tape are carried out so that each of said normal-play reference blocks is recorded continuously on said tape.

3. A method as set forth in claim 1, wherein said second predetermined number of data rows is the same as said first predetermined number of data rows.

4. A method as set forth in claim 1, including preliminary steps of:

receiving said digital video data as transmitted within a series of transport packets of an ATV or DVB signal;

replacing the transport packet identification or ID from each said transport packet with a respective time stamp; and performing a two-to-five mapping operation on respective pairs of said transport packets after replacement of their transport packet identification or IDs, for reformatting each said pair of said transport packets into a unit block composed of five data rows of said normal-play data.

5. A method as set forth in claim 4, including the additional step of:

formatting the trick-play data extracted from said bytes of said independently decodable frame data for each said trick-play speed into unit blocks, each of which is composed of five data rows of said trick-play data with an initial time stamp and an intermediate time stamp inserted therein, so as to emulate the results of said step of performing a two-to-five mapping operation on respective pairs of said transport packets.

6. A method as set forth in claim 4, wherein each time stamp is immediately followed by a respective extra header.

7. A method as set forth in claim 6, wherein each said extra header includes bits representing program identification, data type, transmission bit rate and mode of reproduction.

8. A method as set forth in claim 7, wherein said bits representing mode of reproduction include a toggle bit representing whether a corresponding following transport packet is the earlier or the later of the two transport packets in the unit block and bits representing an identification number for said trick-play data reference block or said trick-parity reference block.

9. A method as set forth in claim 6, wherein said extra headers that immediately follow said time stamps in each unit block contain all the extra header information in said unit blocks.

10. A method for obtaining from a recording tape selected portions of recorded digital video data that include independently decodable frame data supplied during predetermined intervals and dependently decodable frame data supplied during intervening intervals between said predetermined intervals; normal-play data comprising said independently decodable frame data supplied at predetermined intervals and said dependently decodable frame data supplied between said predetermined intervals; trick-play data being supplied for at least one tape speed that is a respective multiple of a first prescribed tape speed used for normal play and being such as to have been extractable from said independently decodable frame data supplied at predetermined intervals; said normal-play data being outer-error-correction-encoded exclusive of the trick-play data and being such as to have been capable of having been formatted in a normal-play reference block having regions for normal-play data, for video auxiliary data, for trick-play data and for outer parity for outer-error-correction encoded normal-play data; said trick-play data for each trick-play speed being outer-error-correction-encoded exclusive of all other data and being such as to have been capable of having been formatted in a trick-play reference block having regions for trick-play data, for outer parity for outer-error-correction encoded trick-play data, and for null data, which said trick-play reference block is larger than the region for trick-play data for that trick-play speed in said normal-play reference block; data rows of said outer-error-correction-encoded normal-play data and of said outer-error-correction-encoded trick-play data being inner-error-correction-encoded and recorded at predetermined positions of a recording tape; said method comprising the steps of:

when said current reproducing mode is a normal mode, reproducing said inner-error-correction-encoded data rows of said outer-error-correction-encoded normal-play data and of said outer-error-correction-encoded trick-play data, as recovered at said first prescribed tape speed;

when said current reproducing mode is said normal mode, decoding the reproduced inner-error-correction-encoded data rows of said outer-error-correction-encoded normal-play data, for correcting each said reproduced data row if possible and otherwise flagging it as being in error, thereby intermittently generating inner-error-correction-decoded normal-play data;

when said current reproducing mode is said normal mode, selecting said intermittently generated inner-error-correction-decoded normal-play data;

when said current reproducing mode is said normal mode, outer-error-correction-decoding said intermittently generated inner-error-correction-decoded normal-play data, as selected in the preceding step, for generating outer- and inner-error-correction-decoded normal-play data as a first selected portion of recorded digital video data obtained during operation in said normal mode at said first prescribed tape speed;

when said current reproducing mode is a trick mode of a second prescribed tape speed that is a multiple of said first prescribed tape speed, reproducing said inner-error-correction-encoded data rows of said outer-error-correction-encoded trick-play data for said second prescribed tape speed recorded at predetermined positions of the tape;

when said current reproducing mode is said trick mode of said second prescribed tape speed, decoding the reproduced inner-error-correction-encoded data rows of said outer-error-correction-encoded trick-play for said second prescribed tape speed, for correcting each said reproduced data row if possible and otherwise flagging it as being in error, thereby intermittently generating inner-error-correction-decoded trick-play data for said second prescribed tape speed;

when said current reproducing mode is said trick mode for said second prescribed tape speed, selecting said intermittently generated inner-error-correction-decoded trick-play data for said second prescribed tape speed; and when said current reproducing mode is said trick mode for said second prescribed tape speed, outer-error-correction-decoding said inner-error-correction-decoded trick-play data for said second prescribed tape speed, as selected in the preceding step, for generating outer- and inner-error-correction-decoded trick-play data for said second prescribed tape speed, as a second selected portion of recorded digital video data obtained during operation in said trick mode for said second prescribed tape speed.

11. A method as set forth in claim 10 including the further step of:

when said current reproducing mode is said normal mode for said first prescribed tape speed, generating a pair of transport packets from each successive group of five consecutive data rows from said first selected portion of recorded digital video data.

12. A method as set forth in claim 10 including the further step of:

when said current reproducing mode is said trick mode for said second prescribed tape speed, generating a pair of transport packets from each successive group of five consecutive data rows from said second selected portion of recorded digital video data.

13. A method as set forth in claim 10 including the further steps of:

when said current reproducing mode is a trick mode of a third prescribed tape speed that is a multiple of said second prescribed tape speed, reproducing said inner-error-correction-encoded data rows of said outer-error-correction-encoded trick-play data for said third prescribed tape speed recorded at predetermined positions of the tape;

when said current reproducing mode is said trick mode of said third prescribed tape speed, decoding the reproduced inner-error-correction-encoded data rows of said outer-error-correction-encoded trick-play for said third prescribed tape speed, for correcting each said reproduced data row if possible and otherwise flagging it as being in error, thereby intermittently generating inner-error-correction-decoded trick-play data for said third prescribed tape speed;

when said current reproducing mode is said trick mode for said third prescribed tape speed, selecting said intermittently generated inner-error-correction-decoded trick-play data for said third prescribed tape speed;

when said current reproducing mode is said trick mode for said third prescribed tape speed, outer-error-correction-decoding said inner-error-correction-decoded trick-play data for said third prescribed tape speed, as selected in the preceding step, for generating outer- and inner-error-correction-decoded trick-play data for said third prescribed tape speed, as a third selected portion of recorded digital video data obtained during operation in said trick mode for said third prescribed tape speed.

14. A method as set forth in claim 13 including the further step of:

when said current reproducing mode is said normal mode for said first prescribed tape speed, generating a pair of transport packets from each successive group of five consecutive data rows from said first selected portion of recorded digital video data.

15. A method as set forth in claim 14 including the further step of:

when said current reproducing mode is said trick mode for said second prescribed tape speed, generating a pair of transport packets from each successive group of five consecutive data rows from said second selected portion of recorded digital video data.

16. A method as set forth in claim 15 including the further step of:

when said current reproducing mode is said trick mode for said third prescribed tape speed, generating a pair of transport packets from each successive group of five consecutive data rows from said third selected portion of recorded digital video data.

17. Recording apparatus for recording digital video data on a recording tape, which digital video data include independently decodable frame data and dependently decodable frame data used together as normal-play data, bytes of which said independently decodable frame data are supplied during predetermined intervals and bytes of which said dependently decodable frame data are supplied during intervening intervals between said predetermined intervals, said apparatus comprising:

first extractor circuitry for extracting said independently decodable frame data from said digital video data;

second extractor circuitry extracting DC coefficients and lower AC coefficients from said independently decodable frame data as expressed in discrete cosine transform, for generating trick-play data for each of a number of trick-play speeds;

first formatter circuitry for formatting said normal-play data and any video auxiliary data into data rows supplied as first formatter circuitry output signal;

a first outer error-correction encoder for outer-error-correction-encoding the data rows in said first formatter circuitry output signal, the outer-error-correction-encoding of the data rows in said first formatter circuitry output signal being done independently of the trick-play data at any said trick-play speed in normal-play reference blocks of data rows including data rows of normal-play outer parity;

second formatter circuitry for formatting said trick-play data for each trick-play speed into data rows;

a respective further outer error-correction encoder for outer-error-correction-encoding the data rows of said trick-play data for each trick-play speed in said second formatter circuitry output signal, the outer-error-correction-encoding of the data rows of said trick-play data for each trick-play speed being done in a respective trick-play reference block of data rows including data rows of trick-play outer parity for that trick-play speed, said trick-play reference block for each said trick-play speed including more data rows than interposed into each normal-play reference block on said recording tape for trickplay at that trick-play speed, said outer-error-correction-encoding of the data rows of said trick-play data for each trick-play speed being done in said respective trick-play reference block independently of normal-play data, any video auxiliary data, or any trick-play data for another trick-play speed;

an assembler for time-division multiplexing said data rows of said normal-play data, any video auxiliary data and said normal-play outer parity derived therefrom with said data rows of trick-play data for each trick-play speed and of trick-play outer parity for that trick-play speed, thereby to generate an assembler output signal;

an inner error-correction encoder for said assembler output signal for appending inner parity information to each data row therein;

means for generating a sync block from each data row with appended inner parity information supplied by said inner error-correction encoder; and recording circuitry including a modulator, for recording each said sync block on a predetermined position of each track on said recording tape.

18. Recording apparatus as set forth in claim 17 wherein said modulator is a 24/25 interleave-NRZ modulator receptive of each said sync block as its modulating signal.

19. Recording apparatus as set forth in claim 17 for recording digital video data transmitted within a series of transport packets of an ATV or DVB signal; wherein said first formatter circuitry replaces the transport packet identification or ID from each said transport packet with a respective time stamp; and wherein said first formatter circuitry performs a two-to-five mapping operation on respective pairs of said transport packets after replacement of their transport packet identification or IDs, thereby reformatting each said pair of said transport packets into a unit block composed of five data rows of said normal-play data.

20. Recording apparatus as set forth in claim 19, wherein each said unit block of said normal-play data as supplied in said assembler output signal is composed of five consecutive data rows of said normal-play data.

21. Recording apparatus as set forth in claim 19, wherein said second formatter circuitry groups said data rows of trick-play data for each trick-play speed into a number of unit blocks each as supplied in said assembler output signal composed of five consecutive data rows of that particular trick-play data, each said unit block composed of five data rows of that particular trick-play data beginning with a respective time stamp and including immediately after the middle thereof a respective further time stamp.

22. Recording apparatus as set forth in claim 17 for recording digital video data transmitted within a series of transport packets of an ATV or DVB signal; wherein said first formatter circuitry replaces the transport packet identification or ID from each said transport packet with a respective time stamp followed by an extra header; and wherein said first formatter circuitry performs a two-to-five mapping operation on respective pairs of said transport packets after replacement of their transport packet identification or IDs, thereby reformatting each said pair of said transport packets into a unit block composed of five data rows of said normal-play data.

23. Recording apparatus as set forth in claim 22, wherein each said unit block of said normal-play data as supplied in said assembler output signal is composed of five consecutive data rows of said normal-play data.

24. Recording apparatus as set forth in claim 22, wherein said second formatter circuitry groups said data rows of trick-play data for each trick-play speed into a number of unit blocks each as supplied in said assembler output signal composed of five consecutive data rows of that particular trick-play data, each said unit block composed of five data rows of that particular trick-play data beginning with a respective time stamp and a respective extra header and including immediately after the middle thereof a respective further time stamp and a respective further extra header.

25. Reproduction apparatus for reproducing from a recording tape selected portions of recorded digital video data that include independently decodable frame data supplied during predetermined intervals and dependently decodable frame data supplied during intervening intervals between said predetermined intervals; normal-play data comprising said independently decodable frame data supplied at predetermined intervals and said dependently decodable frame data supplied between said predetermined intervals; trick-play data being supplied for at least one tape speed that is a respective multiple of a first prescribed tape speed used for normal play and being such as to have been extractable from said independently decodable frame data supplied at predetermined intervals; said normal-play data being outer-error-correction-encoded exclusive of the trick-play data and being such as to have been capable of having been formatted in a normal-play reference block having regions for normal-play data, for video auxiliary data, for trick-play data and for outer parity for outer-error-correction encoded normal-play data; said trick-play data for each trick-play speed being outer-error-correction-encoded exclusive of all other data and being such as to have been capable of having been formatted in a trick-play reference block having regions for trick-play data, for outer parity for outer-error-correction encoded trick-play data, and for null data; said trick-play reference block for each said trick-play speed containing more data rows than interposed into each normal-play reference block recorded on said recording tape for trickplay at that said trick-play speed; data rows of said outer-error-correction-encoded normal-play data and of said outer-error-correction-encoded trick-play data being inner-error-correction-encoded and recorded at predetermined positions of a recording tape; said reproduction apparatus comprising:

a demodulator for signal from said recording tape, generating a demodulated signal and supplying said demodulated signal as bytes of reproduced inner-error-correction-encoded data rows of said outer-error-correction-encoded normal-play data and of said outer-error-correction-encoded trick-play data for each prescribed trick-play speed;

an inner-error-correction-code decoder decoding the reproduced inner-error-correction-encoded data rows of said outer-error-correction-encoded normal-play data and of said outer-error-correction-encoded trick-play data, for supplying an inner-error-correction-code decoder signal together with flags indicating which of said data rows probably still contain error;

a disassembler for separating sets of data rows from each other, said sets of data rows comprising a set of data rows of outer-error-correction-encoded normal-play data and a respective further set of data rows of said outer-error-correction-encoded trick-play data for each prescribed trick-play speed; and an outer-error-correction-code decoder decoding one said further set of data rows of said outer-error-correction-encoded trick-play data, when reproducing from a recording tape at a corresponding one of said prescribed trick-play speeds, for supplying outer-error-correction-decoded trick-play data at that said prescribed trick-play speed.

26. Reproduction apparatus as set forth in claim 25, wherein said outer-error-correction-code decoder decodes said set of data rows of said outer-error-correction-encoded normal-play data, when reproducing from a recording tape at said first prescribed speed during normal play, for supplying outer-error-correction-decoded normal-play data.

27. Reproduction apparatus as set forth in claim 26, further comprising:

deformatting means, responsive to said outer-error-correction-decoded normal-play data during said normal mode and responsive to said outer-error-correction-decoded trick-play data during said trick mode, for supplying reproduced recorded digital video data with a transport packet structure.

28. Reproduction apparatus for reproducing from a recording tape selected portions of recorded digital video data that include independently decodable frame data supplied during predetermined intervals and dependently decodable frame data supplied during intervening intervals between said predetermined intervals; normal-play data comprising said independently decodable frame data supplied at predetermined intervals and said dependently decodable frame data supplied between said predetermined intervals; trick-play data being supplied for at least one tape speed that is a respective multiple of a first prescribed tape speed used for normal play and being such as to have been extractable from said independently decodable frame data supplied at predetermined intervals; said normal-play data being outer-error-correction-encoded exclusive of the trick-play data and being such as to have been capable of having been formatted in a normal-play reference block having regions for normal-play data, for video auxiliary data, for trick-play data and for outer parity for outer-error-correction encoded normal-play data; said trick-play data for each trick-play speed being outer-error-correction-encoded exclusive of all other data and being such as to have been capable of having been formatted in a trick-play reference block having regions for trick-play data, for outer parity for outer-error-correction encoded trick-play data, and for null data; said trick-play reference block for each said trick-play speed containing more data rows than interposed into each normal-play reference block recorded on said recording tape for trickplay at that said trick-play speed; data rows of said outer-error-correction-encoded normal-play data and of said outer-error-correction-encoded trick-play data being inner-error-correction-encoded and recorded at predetermined positions of a recording tape; said reproduction apparatus comprising:

a demodulator for signal from said recording tape, generating a demodulated signal and supplying said demodulated signal as bytes of reproduced inner-error-correction-encoded data rows of said outer-error-correction-encoded normal-play data and of said outer-error-correction-encoded trick-play data for each prescribed trick-play speed;

an inner-error-correction-code decoder decoding the reproduced inner-error-correction-encoded data rows of said outer-error-correction-encoded normal-play data and of said outer-error-correction-encoded trick-play data, for supplying an inner-error-correction-code decoder signal together with flags indicating which of said data rows probably still contain error;

a disassembler for separating sets of data rows from each other, said sets of data rows comprising a set of data rows of outer-error-correction-encoded normal-play data and a respective further set of data rows of said outer-error-correction-encoded trick-play data for each prescribed trick-play speed;

a first outer-error-correction-code decoder decoding at least one said set of data rows of said outer-error-correction-encoded normal-play data, when reproducing from a recording tape at said first prescribed speed, for supplying outer-error-correction-decoded normal-play data; and a second outer-error-correction-code decoder decoding one said further set of data rows of said outer-error-correction-encoded trick-play data, when reproducing from a recording tape at a corresponding one of said prescribed trick-play speeds, for supplying outer-error-correction-decoded trick-play data at that said prescribed trick-play speed.

29. Reproduction apparatus as set forth in claim 28, further comprising:

deformatting means, responsive to said outer-error-correction-decoded normal-play data during said normal mode and responsive to said outer-error-correction-decoded trick-play data during said trick mode, for supplying reproduced recorded digital video data with a transport packet structure.

30. Reproduction apparatus as set forth in claim 29, wherein said deformatting means comprises:

first deformatting circuitry for converting said outer-error-correction-decoded normal-play data to converted outer-error-correction-decoded normal-play data with a transport packet structure;

second deformatting circuitry for converting said outer-error-correction-decoded trick-play data of said first prescribed trick-play speed to converted outer-error-correction-decoded trick-play data with a transport packet structure; and a selector, selecting said converted outer-error-correction-decoded normal-play data as said reproduced recorded digital video data with a transport packet structure during normal play at said first prescribed tape speed, and selecting said converted outer-error-correction-decoded trick-play data as said reproduced recorded digital video data with a transport packet structure during trick play at a tape speed that is a multiple of said first prescribed tape speed.

* * * * *